W. J. KENNEDY.
GAS STOVE.
APPLICATION FILED JAN. 29, 1909.
985,038.
Patented Feb. 21, 1911.
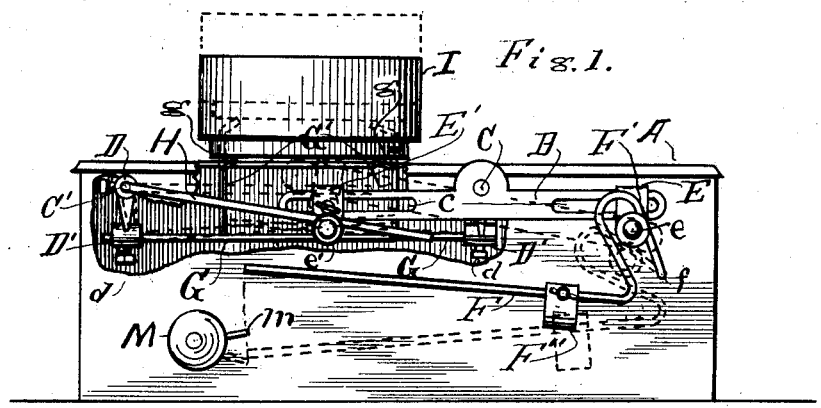
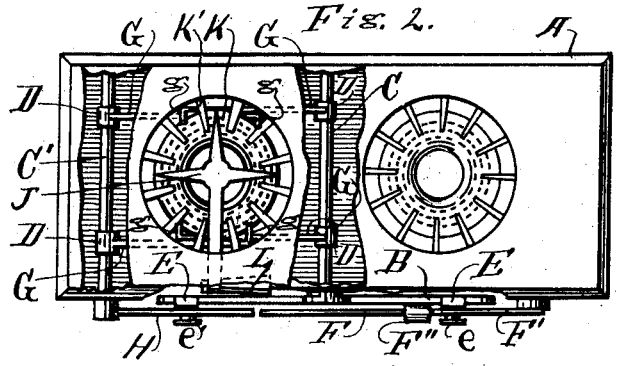
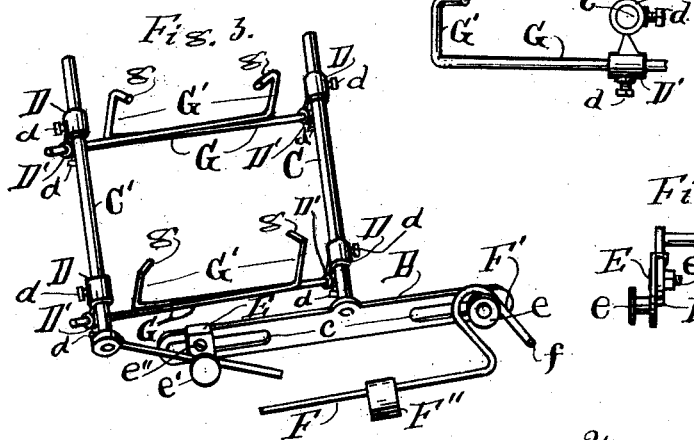
Witnesses
Inventor
Walter J. Kennedy
Attorney

UNITED STATES PATENT OFFICE.

WALTER J. KENNEDY, OF GRAND RAPIDS, MICHIGAN.

GAS-STOVE.

985,038.  Specification of Letters Patent.  Patented Feb. 21, 1911.

Application filed January 29, 1909. Serial No. 475,061.

*To all whom it may concern:*

Be it known that I, WALTER J. KENNEDY, a citizen of the United States, residing at Grand Rapids, in the county of Kent and State of Michigan, have invented certain new and useful Improvements in Gas-Stoves, of which the following is a specification.

My invention relates to improvements in appliances for use upon gas stoves and ranges, and more particularly in connection with the valves upon which Letters Patent No. 867,139 dated September 24, 1907, No. 887,945 dated May 19, 1908 and No. 894,957, dated August 4, 1908, have been issued to me, and its objects are: first, to provide an appliance with which a kettle of meat, potatoes or other food may be so balanced that as soon as a given amount of water has been evaporated the kettle will be raised upward from the burner and the fire will be extinguished, and, second, to provide an appliance of the kind hereinbefore mentioned that will sound an alarm as soon as the kettle is raised upward from the burner. I attain these objects by the mechanism illustrated in the accompanying drawing in which—

Figure 1 is an elevation of a gas stove with the side cut away to show the manner of attaching and operating my appliance. Fig. 2 is a plan of the same. Fig. 3 is a perspective of the appliance disconnected from the stove. Fig. 4 shows the manner of attaching the elevating arm to the actuating shaft, and Fig. 5 is an end view of the actuating beam showing the manner of attaching the antifriction roller or spool.

Similar letters refer to similar parts throughout the several views.

In the accompanying drawing I have shown, in Fig. 2, the lever J and the valve case L substantially as the corresponding parts are shown in each of the several patents hereinbefore mentioned.

My present invention consists of an actuating beam B which is pivotally secured to the stove A by means of the shaft C, in such a manner that if either end of this beam is raised or depressed it will cause the shaft to oscillate accordingly. On the opposite side of the burner K I place a second oscillating shaft C' and on each of these shafts I place two arms G G, secured to the hubs D' in such a manner that they may be adjusted longitudinally to fit any size of stove, and the other ends of these arms are bent upward, as at G', to pass through the grating K' over the burner K, and the upper ends $g$, are bent diagonally inward so as to extend over a considerable length on the bottom of any cooking utensil that may be placed upon the stove. The hubs D' are made integral with a second hub for each arm, as D, that is mounted upon the shafts C C' in such a manner that they may be moved longitudinal of these shafts to adjust the arms G to any width of stove, and the hubs D and D' are secured to their respective shafts and arms by means of set screws $d$ $d$.

The beam B is, as hereinbefore stated, securely attached to the shaft C, and is provided with a short slot $c$ at each end in which to secure and adjust the yokes E E' to vary the movement of the beam, which is actuated as follows: There is a lever F pivotally secured to the side of the stove A, as at $f$, which is bent at the attached end to form a bearing F' that stands at a considerable incline from the perpendicular and rests upon the antifriction roller or spool $e$ in such a manner that if sufficient weight is placed upon the lever F the inclined bearing F' will force the end of the beam B downward, and, consequently, the other end of this beam will be forced upward, which will cause the shaft C to revolve slightly and carry the outer ends of the arms G that are supported upon this shaft to be raised upward above the surface of the stove, and, at the same time, the arm H, which is secured to or made integral with the shaft C', is raised upward by the spool $e'$ which causes the free end of the arms G that are secured to the shaft C' to rise exactly the same as the before mentioned arms are raised by the shaft C, so that a uniform support is formed of the ends $g$ $g$ of these arms for raising the cooking utensil I, as indicated in Fig. 1. The yokes E E' are secured to the beam B by means of any suitable fastening, as the stove bolts $e''$, in such a manner that they may be readily adjusted longitudinally of the beam.

In operation, we will say that a certain amount of meat is placed in the cooking utensil I and, with it, a sufficient amount of water to boil without danger of burning the meat. This done the weight F'' is placed upon the lever F to just raise the utensil and its contents, and then place as much more water in the kettle as is necessary to thoroughly and safely cook the meat, which will force the arms G G down far enough to carry the lever J down so as to cause the gas at the burner to ignite, as described in the several patents hereinbefore mentioned, and when the water has boiled away or evaporated until it reaches the weight first placed in the utensil the weight F'' will carry the lever F downward and force the arms G G upward sufficiently to raise the utensil until the lever J cuts off the flow of gas and the fire is extinguished by the closing of the valve L, which action renders it impossible to burn the contents of the utensil.

It will be readily understood that if the valve L and the lever J are not in use on the stove the operation of this device would be effective but to a lesser degree, as the utensil would be raised sufficiently to allow an air space between the bottom of the utensil and the flame of the fire to greatly lessen the degree of heat on the utensil and, thus, lessen the danger of burning the contents of the utensil, but when this is depended upon I prefer that some means be provided for sounding an alarm when the appliance is made to operate, as, for instance, a bell M placed in position so that the lever F, when moving downward, will engage the handle $m$ and carry it down, as indicated in Fig. 1, and thus cause the bell to ring. With this arrangement the device may be made as effective upon an ordinary wood or coal stove as on a gas stove, showing, conclusively, that the utensil is not restricted to use upon a gas stove, or with the valve and lever heretofore patented to me, as herein stated, but may be used independent thereof.

The dotted lines in Fig. 1 illustrate the movement of the lever F, the beam B, the several shafts, arms and the cooking utensil.

If desired the lever F may be raised to and supported upon the spool $e'$, or other proper support, and thereby render the appliance inoperative, or the same object may be accomplished by moving the weight F'' far enough back upon the lever F so that it will not exercise sufficient leverage to force the arms G G upward, which is often desirable, as when cooking griddle cakes, &c.

I find that this appliance may be so nicely adjusted as to shut off the heat at the moment that sufficient evaporation has taken place from bread or cake batter to insure its proper baking and no more.

Having described my invention, what I claim as new, and desire to secure by Letters Patent of the United States, is:

1. In a safety attachment for stoves, a burner, two parallel shafts revolubly mounted directly under the top of the stove with one each side of the stove burner, a beam securely mounted on one of said shafts and having slots therein and antifriction rollers thereon, an arm extending from the other shaft and engaging one of said antifriction rollers, a lever pivotally secured to the side of the stove and having a portion inclined from the perpendicular in position to engage the other of said rollers and actuate the beam and cause the shafts to revolve in opposite directions, an adjustable weight upon the lever, and arms upon the shafts having upwardly extending wings in position to pass through the grating over the burner and when the shafts are made to revolve and raise any cooking utensil that may be placed upon the stove, to prevent burning the contents thereof.

2. In a safety device for stoves, a burner, two shafts revolubly mounted directly under the top of the stove, one each side of the stove burner, a beam centrally mounted upon one of said shafts and adjustable rollers mounted thereon, a lever mounted upon the other shaft in position to engage one of said rollers, a lever pivotally secured to the side of the stove and having a portion inclined from the perpendicular and in position to engage the other roller to actuate the beam, an adjustable weight on said lever, arms mounted on the shafts and extending by each other and having upwardly extending wings in position to pass up between the grates over the burner of the stove, and again bent diagonally inward to position to receive the bottom of a cooking utensil over the burner of the stove and so arranged that the utensil will be lowered or raised by the action of the lever and weight, as water is filled into or evaporated from the utensil.

3. In a safety device for stoves, a burner, a shaft revolubly mounted directly under the top of the stove each side of the stove burner, a beam mounted upon one of said shafts and having slots in the ends, adjustable rollers secured, one at each end of the beam, a lever mounted on the other shaft in position to be actuated by one of the rollers on the beam, a lever pivotally mounted on the stove and having a portion made to stand at an incline from the perpendicular and engage the other roller to actuate the beam, an adjustable weight on said lever, arms upon the shafts adapted to oscillate with the shafts to actuate any cooking utensil on the stove as weight is added to or removed from the utensil, and a bell placed in position to be rung when weight is removed from the utensil sufficiently to actuate the safety device.

4. In a safety device for use upon gas stoves, a burner, shafts mounted directly under the top of the stove with one on each side of the stove burner, a beam mounted upon one of said shafts, adjustable rollers located with one at each end of said beam, a lever secured to the other of said shafts in position to be engaged and actuated by one of the rollers on the beam, a lever pivoted to the stove in position to engage the other roller and actuate the beam, a weight upon said lever, arms upon the shafts in position to extend upward through the grating over the stove burner and engage and support a cooking utensil over the burner to raise said utensil when certain weight has been removed from the utensil, and a gas valve having an actuating arm extending over the stove burner in position on the stove to be actuated by the moving utensil to ignite and extinguish a flame as the utensil is raised or lowered.

5. In a safety device for gas stoves, a burner, a shaft mounted directly under the top of the stove at each side of the stove burner, arms adjustably mounted on said shafts and having the ends bent upward to position to receive and support a cooking utensil, means for actuating said shafts to throw the arms to position to raise the utensil as weight is removed therefrom, and a gas valve having an actuating arm extending over the stove burner in position to be actuated when the utensil is raised, to extinguish the fire from the stove burner.

6. In a safety device for gas stoves, a burner, a shaft mounted directly under the top of each side of the stove burner and having arms adjustably mounted thereon in position to raise a cooking utensil upward from the burner when sufficient water has evaporated therefrom, means for actuating the shafts and arms at the proper time, a gas valve having an actuating arm extending over the stove burner in position to be actuated by the rising utensil to extinguish the fire at the burner, and a bell in position to be rung as the utensil rises upward.

7. In combination with a gas stove, a burner and a gas valve thereon, a shaft revolubly mounted just below the top of the stove each side of the stove burner and having arms adjustably mounted thereon in position to bear upon the bottom of a cooking utensil, levers, rollers and weights arranged to actuate said arms to raise the cooking utensil when a certain amount of water has evaporated, so that the valve may operate to extinguish a fire that may be burning under the utensil.

Signed at Grand Rapids Michigan January 27, 1909.

WALTER J. KENNEDY.

In presence of—
  I. J. Cilley,
  Geo. E. Shafer.